US010906265B2

(12) United States Patent
Symkens et al.

(10) Patent No.: US 10,906,265 B2
(45) Date of Patent: Feb. 2, 2021

(54) METHOD FOR PRODUCING A PRINTED DECORATIVE PAPER

(71) Applicant: Trespa International B.V., Weert (NL)

(72) Inventors: Stefan Henri Dominique Maria Symkens, Weert (NL); Isabel Maria Marques Da Silva Macedo, Weert (NL)

(73) Assignee: TRESPA INTERNATIONAL B.V., Weert (NL)

( * ) Notice: Subject to any disclaimer, the term of this patent is extended or adjusted under 35 U.S.C. 154(b) by 427 days.

(21) Appl. No.: 15/625,616

(22) PCT Filed: Dec. 24, 2015

(86) PCT No.: PCT/NL2015/050909
§ 371 (c)(1),
(2) Date: Jun. 16, 2017

(87) PCT Pub. No.: WO2016/105202
PCT Pub. Date: Jun. 30, 2016

(65) Prior Publication Data
US 2018/0001592 A1    Jan. 4, 2018

(30) Foreign Application Priority Data
Dec. 24, 2014  (NL) ..................... 2014060

(51) Int. Cl.
| B32B 5/02 | (2006.01) |
| B32B 21/06 | (2006.01) |
| B32B 29/02 | (2006.01) |
| B32B 29/06 | (2006.01) |
| D21H 27/28 | (2006.01) |
| B41M 1/10 | (2006.01) |
| B41M 1/22 | (2006.01) |
| B41M 7/00 | (2006.01) |
| B44C 5/04 | (2006.01) |
| B44C 1/10 | (2006.01) |

(52) U.S. Cl.
CPC ............ *B32B 5/022* (2013.01); *B32B 21/06* (2013.01); *B32B 29/02* (2013.01); *B32B 29/06* (2013.01); *B41M 1/10* (2013.01); *B41M 1/22* (2013.01); *B41M 7/0045* (2013.01); *B44C 1/10* (2013.01); *B44C 5/04* (2013.01); *D21H 27/28* (2013.01); *B32B 2260/00* (2013.01); *B32B 2260/028* (2013.01); *B32B 2260/046* (2013.01); *B32B 2307/402* (2013.01); *B32B 2307/4023* (2013.01); *B32B 2307/4026* (2013.01); *B32B 2307/412* (2013.01); *B32B 2307/584* (2013.01)

(58) Field of Classification Search
USPC ...... 428/423.1, 424.2, 424.4, 203, 205, 207; 427/385.5; 156/327; 264/137, 448
See application file for complete search history.

(56) References Cited

U.S. PATENT DOCUMENTS

| 3,789,604 | A | | 2/1974 | Hurt |
| 4,501,635 | A | | 2/1985 | Siry et al. |
| 4,652,482 | A | * | 3/1987 | Diesel ..................... B32B 29/04 428/151 |
| 4,801,495 | A | | 1/1989 | van der Hoeven |
| 4,927,572 | A | * | 5/1990 | van der Hoeven ... B44C 5/0415 264/448 |
| 5,718,950 | A | * | 2/1998 | Komatsu ................ B05D 5/065 427/405 |
| 7,192,543 | B2 | | 3/2007 | Malfliet et al. |
| 9,321,278 | B2 | * | 4/2016 | Clement ............... B44C 5/0446 |
| 2011/0244200 | A1 | * | 10/2011 | Van De Wall ........ B44C 5/0469 428/201 |

FOREIGN PATENT DOCUMENTS

WO    2010/064895 A    6/2010

OTHER PUBLICATIONS

PCT/NL2015/050909 International Preliminary Report on Patentability.

* cited by examiner

*Primary Examiner* — Lynda Salvatore
(74) *Attorney, Agent, or Firm* — Roberts & Roberts, LLP

(57) ABSTRACT

The present invention relates to method for producing a printed decorative paper comprising the steps of: i) providing a substrate paper; ii) applying to said substrate paper a decorative layer; iii) applying to said decorative layer a liquid coating consisting essentially of a polymerizable mixture; iv) applying polymerization conditions to form a polymerized layer on said decorative layer. An object of the present invention is to provide a method for manufacturing a printed decorative paper, which decorative paper is processed to form a decorative panel, which decorative panel thus obtained will exhibit a good resistance against weather influences.

14 Claims, No Drawings

METHOD FOR PRODUCING A PRINTED DECORATIVE PAPER

The present method relates to a method for producing a printed decorative paper comprising the steps of providing a substrate paper, applying to said substrate paper a decorative layer, applying to said decorative layer a liquid coating consisting essentially of a polymerizable mixture and applying polymerization conditions to form a polymerized layer on said decorative layer. The present invention further relates to a printed decorative paper, to a method for producing a decorative panel and to a decorative panel.

A decorative paper or a decorative film is used for decorating plate materials, which plate materials are based mainly on resin-impregnated wood fibers. Such a decorative panel is known from U.S. Pat. Nos. 3,789,604 and 4,801,495 in the name of the present applicant. The decorative films known from said US patents are given a structured surface by using a polyester or polypropylene film. Such decorative films are further passed between two rollers, during which passage the structure present on the roller surface is transferred to the decorative film, which means that a repetitive pattern corresponding to the pattern present on the outer surface of the roller(s) will form on the decorative film.

International application WO2010-064895 in the name of the present applicant relates to a decorative film comprising a substrate, an intermediate layer, a decorative layer and a protective layer. The composition of the intermediate layer is such that the inkjet-applied decorative layer present on the intermediate layer cannot permeate into the substrate. The intermediate layer contains aliphatic urethane groups and is pigmented so as to thus realize a defined color, by means of which the color of the underlying substrate is masked. A white intermediate layer, pigmented with titanium dioxide serves to protect the substrate against the action of light on the photosensitive substrate. For said protection, substances which need not be transparent or colorless may be used, such as titanium dioxide.

From U.S. Pat. No. 4,927,572 in the name of the present applicant there is known a decorative panel in which a resin-impregnated decorative paper is used, which panel is characterized by a scratch resistance of at least 1.5 Newton and a resistance against weather influences which complies with ASTM G53-84.

From German Offenlegungsschrift DE 44 13 619 there is known a method for manufacturing a decorative paper in which a decorative paper is impregnated with a water dilutable and electron beam curable acrylate in the form of a dispersion, an emulsion or a solution, followed by a thermal drying treatment and the application of a coat of varnish, after which curing by means of electron radiation takes place.

From Dutch laid-open publication No. 7015324 there is known a method for curing a curable synthetic resin material, wherein a polymer containing unsaturated groups is used as a coating, which coating is exposed to radiation from an electron beam having an energy of 25-300 kV. Unsaturated polyesters mixed with unsaturated liquid monomers, such as styrene, acrylates or methacrylates, are mentioned as suitable polymers.

German Offenlegungsschrift DE 28 01 396 discloses a method for impregnating a substrate material with a thermally crosslinkable resin, whereupon a thermal treatment is carried out, after which a radiation-curable resin is applied to the surface thus obtained, in which connection in particular acrylate resins are mentioned.

From U.S. Pat. No. 4,501,635 there is known a method in which decorative paper is impregnated with a material based on a ureum formaldehyde resin and an acryl dispersion, followed by a thermal treatment, whereupon a urethane/acrylate based resin is applied, which resin is cured by means of electron radiation.

The process of manufacturing decorative paper by impregnation with a resin, followed by a thermal treatment, is known per se, for example from European patent application EP 0 022 153 and German Patentschrift DE 217 252, in which latter Patentschrift it is explicitly indicated that a decorative paper thus impregnated may additionally be provided with a varnish coating. The following documents can furthermore be mentioned in connection with the impregnation of decorative paper with a resin: German Offenlegungsschrifts Nos. 2 727 312; 2 903 172; 2 224 732; 3 630 315; 3 541 187; 3 329 679 and 3 024 394; European patent publication EP 1 923 211 as well as U.S. Pat. No. 7,192,543.

The traditional process of manufacturing HPL (high-pressure laminates) and HPL compact plates is carried out in a press under elevated temperature and pressure conditions.

The present applicant has found that it is desirable in the manufacture of a decorative panel, where a decorative paper is affixed to a core material and the whole is subsequently placed in a press under high pressure and temperature conditions and pressed together to form the intended decorative panel, that the decorative paper exhibits a good adhesion with the core.

An object of the present invention is to provide a method for manufacturing a printed decorative paper, which decorative paper is processed to form a decorative panel, which decorative panel thus obtained will exhibit a good resistance against weather influences.

Another object of the present invention is to provide a method for manufacturing a printed decorative paper wherein the visual appearance of the surface color of a decorative panel incorporating such a printed decorative paper is maintained of a prolonged period of time.

The present invention thus relates to a method for producing a printed decorative paper comprising the steps of:
  i) providing a substrate paper;
  ii) applying to said substrate paper a decorative layer;
  iii) applying to said decorative layer a liquid coating consisting essentially of a polymerizable mixture;
  iv) applying polymerization conditions to form a polymerized layer on said decorative layer, wherein said step ii) of applying to said substrate paper a decorative layer comprises a step a) of applying a binder and metallic pigments on said substrate paper for manufacturing a printed metallic layer.

The present inventor found that by using special metallic pigments in the printed design layer of HPL panels surface it is possible to obtain highly attractive decorative surfaces from aesthetics point of view. The present types of surfaces provide weather resistant properties that allow the usage of these surfaces in panels for exterior application. The present inventors assume that the present kind of surfaces for exterior HPL panels withstand extreme weather conditions for at least 10 years.

The method for producing a printed decorative paper according to the present invention preferably further comprises a step b) of applying additional binder and pigments in discrete parts on said printed metallic layer obtained according to step a) for manufacturing a printed pigmented design layer, wherein said pigments in step b) are non-metallic pigments. This step b) is carried out after step a). Thus step b) can be considered as a further step of step ii).

According to a preferred embodiment step b) is repeated at least two times for obtaining several layers of additional binder and pigments in discrete parts for manufacturing several printed pigmented design layers, wherein said pigments in step b) are non-metallic pigments.

The present method further comprises a step c) of applying a transparent layer of binder on said printed pigmented design layer(s) obtained after step b) for manufacturing a transparent binder layer.

This step c) is carried out after step b). Thus step c) can be considered as a further step of step ii). In other words, in this embodiment of the present method step ii) comprises step a), step b) and step c) in succession. The liquid coating according to step iii) preferably consists of radiation curable components and/or thermo curable components. This embodiment of the present method will result in a product that can be identified as a first build-up comprising, in succession, a substrate paper, provided with a printed metallic layer, i.e. binder and metallic pigments, printed pigmented designs, i.e. binder and non-metallic pigments, said printed pigmented designs may consist of several layers, and a transparent layer.

According to another preferred embodiment the present method for producing a printed decorative paper further comprises a step d) of applying a transparent layer of binder on said printed metallic layer obtained according to step a) for manufacturing a transparent binder layer. This means that according to this embodiment step ii) comprises step a) and step d), wherein step a) is followed by step d). In this embodiment of the present invention there is no step b) or c).

The method for producing a printed decorative paper according to the present invention preferably comprises in this embodiment a step e) of applying additional binder and pigments in discrete parts on said transparent binder layer, as obtained after step d), for manufacturing a printed pigmented design layer, wherein said pigments in step e) are non-metallic pigments.

This step e) is carried out on the layer obtained after step d). In this embodiment step ii) comprises step a), step d) and step e), in succession. The liquid coating according to step iii) preferably consists of radiation curable components and/or thermo curable components. This embodiment of the present method will result in a product that can be identified as a second build-up comprising, in succession, a substrate paper, provided with a printed metallic layer, i.e. binder and metallic pigments, a transparent layer and printed pigmented designs, i.e. binder and non-metallic pigments, said printed pigmented designs may consist of several layers.

It is furthermore preferred that step e) is repeated at least two times for obtaining several layers of additional binder and pigments in discrete parts for manufacturing several printed pigmented design layers, wherein said pigments in step e) are non-metallic pigments. Examples of non-metallic pigments are Yellow 42, Yellow 35, Yellow 53, Yellow 184, Yellow 157, Yellow 161, Brown 24, Carbon black, White TiO2, Red 49, and Blue 29. The non-metallic pigments are preferably inorganic due the desired weather resistance.

The type of binder for manufacturing said transparent binder layer, especially the transparent binder as applied in both step c) and step d), is preferably a non-radiation curable material, more preferably a water-soluble casein based binder. Other preferred binders are cellulose derivative, polyurethane or acrylic acid resins.

The liquid coating according to step iii) preferably consists of radiation curable components and/or thermo curable components, especially synthetic resin chosen from the group of radiation polymerizing and thermosetting resins, more especially urethane acrylates. Examples of preferred radiation-polymerized synthetic resin polymers are at least one oligomer selected from the group consisting of an epoxy-acrylate, an epoxy-methacrylate, a silicone-acrylate, a silicone-methacrylate, a polyester acrylate, a polyester methacrylate, a urethane acrylate, and a urethane methacrylate, especially an aliphatic urethane acrylate oligomer.

According to a preferred embodiment the metallic pigments in the composition of step a), comprising binder and metallic pigments, have an average size distribution of 5-40 micrometer. A preferred method to measure metallic pigment particle sizes is laser diffraction.

A preferred example of the metallic pigments is $TiO_2$ coated mica of a rutile nature. These metallic pigments are preferably platelets, flakes or whiskers. In a preferred embodiment the metallic pigments according to the present invention are pearl luster pigments consisting of thin platelets of the natural material mica, coated in a wafer-thin layer of metal oxide, preferably titanium dioxide and/or iron oxide. Other preferred embodiments of such pearl luster pigments are borosilicate flakes coated with metal oxides.

The amount of said composition of step a), comprising binder and metallic pigments, is preferably in a range of 2-15 $g/m^2$.

The amount of said composition of step b) or step e), comprising binder and non-metallic pigments, is preferably in a range of 2-15 $g/m^2$.

The amount of said composition of step c) or step d), comprising transparent binder, is preferably in a range of 2-15 $g/m^2$.

The amount of said liquid coating of step iii) is preferably in a range of 10-200 $g/m^2$.

The present invention thus covers basically two different build-ups, i.e. a first build-up comprising, in succession, a substrate paper, provided with a printed metallic layer, i.e. binder and metallic pigments, printed pigmented designs, i.e. binder and non-metallic pigments, said printed pigmented designs may consist of several layers, and a transparent layer. A second build-up comprises, in succession, a substrate paper, provided with a printed metallic layer, i.e. binder and metallic pigments, a transparent layer and printed pigmented designs, i.e. binder and non-metallic pigments, said printed pigmented designs may consist of several layers. The difference between the first build-up and the second build-up is the specific location of the printed pigmented designs, i.e. in the first build-up the printed pigmented designs is adjacent to the printed metallic layer whereas in the second build-up the transparent layer is adjacent to the printed metallic layer.

The present invention furthermore relates to a method for producing a decorative panel wherein the printed decorative paper obtained according to the present method is used. Such a method comprises steps of providing the printed decorative paper; applying to said printed decorative paper a core layer and thermo pressing, said decorative layer and said core layer together under conditions of elevated temperature and pressure such that during said thermo pressing, said printed decorative paper, with said polymerized surface layer located thereon, rests on said core such that said polymerized surface layer forms the outermost layer of said decorative panel.

Preferred embodiments of the core layer are at least one material selected from the group consisting of wood, a plurality of sheets of paper, plastic, or metal nonwoven fabric, fiber mats, especially thermo pressed stack of synthetic resin impregnated fiber-containing layers, thermoplastic based with mineral fibers, metal sheet and minerals combined with thermosetting polymer.

The present invention furthermore relates to a printed decorative paper comprising a printed metallic layer comprising binder and metallic pigments and one or more printed pigmented design layers comprising binder and non-metallic pigments, wherein said one or more printed pigmented design layers are applied in discrete parts.

In a preferred embodiment of the printed decorative paper the metallic pigments have an average size distribution of 5-40 μm.

According to another preferred embodiment the metallic pigments present in the printed decorative paper according to present invention are $TiO_2$ coated mica of a rutile nature.

The present invention furthermore relates to a decorative panel comprising a core layer and a decorative layer applied thereto, said decorative layer comprising a polymerized surface layer forming the outermost layer of said decorative panel, wherein said decorative layer comprises a printed metallic layer comprising binder and metallic pigments and one or more printed pigmented design layers comprising binder and non-metallic pigments, wherein said one or more printed pigmented design layers are applied in discrete parts.

In a preferred embodiment of the present decorative panel the pigments have an average size distribution of 5-40 μm.

According to another preferred embodiment the metallic pigments present in the printed metallic layer of the decorative panel according to the invention are $TiO_2$ coated mica of a rutile nature. In a preferred embodiment the metallic pigments according to the present invention are pearl luster pigments consisting of thin platelets of the natural material mica, coated in a wafer-thin layer of metal oxide, preferably titanium dioxide and/or iron oxide. Other preferred embodiments of such pearl luster pigments are borosilicate flakes coated with metal oxides.

The present inventors thus found that panels, especially HPL (high pressure laminates) can now be produced using coatings that are radiation curable, that withstand high pressure/temperature in production processes and that resist extreme weathering conditions for at least 10 years. The present invention provides coatings that fulfill these conditions, preferably in combination with the present metallic gloss/matt decorative surface. Thus, the present invention provides the incorporation of the present decorative surface into HPL technology/processes, the utilization of decorative surfaces in facade panels (exterior standards weather resistance) in combination with radiation curable coatings.

The specifications of the decorative panels manufactured according to the present method are as follows: Grey scale≥4 according to ISO 105 A02 assessment method, Test method: Florida cycle 3000 h, which corresponds to 10 years in Florida climate for a vertical application. The test is partially according to ISO4892.

The invention will be explained in detail by means of the following examples. The percentages given are by weight.

EXAMPLE 1

The process for producing a printed decorative paper in Example 1 comprises a step of providing a substrate paper and applying by rotogravure printing a mixture of binder and metallic pigments on the substrate paper for obtaining a printed metallic layer. The area coverage of the mixture on the substrate paper is about 100%. In the next step a mixture of binder and non-metallic pigments is applied on the product obtained after rotogravure printing, i.e. the printed metallic layer. The mixture of binder and non-metallic pigments is applied in a partial coverage, and the application is repeated two times for obtaining printed non-metallic pigmented design layers. Finally, a transparent layer of binder is applied on the printed non-metallic pigmented design layers. In this Example 1 the printed metallic layer comprises pigment Iriodin 9103 (Merck) and a water soluble casein based binder, in a total amount of about 3 g/m² after drying. The printed non-metallic pigmented layers comprise two layers, in a total amount of about 3 g/m² after drying the two layers together. The printed non-metallic pigmented layers further comprise pigments carbon black, blue29, red49, white $TiO_2$+ water soluble casein based binder. The transparent layer comprises water soluble casein based binder, in a total amount of about 3 g/m² after drying. The outermost layer is a radiation curing transparent coating on basis of a polyurethane acrylate radiation curable resin, in a total amount of about 75 g/m².

On basis of the printed decorative paper thus manufactured several HPL panels were manufactured according to the process conditions, core materials and outer polymerized layer as disclosed in Example 1 of U.S. Pat. No. 4,927,572.

The results of panels thus manufactured are: a grey scale of 4, after weathering test (according to ISO 105 A02 assessment method). The production scale tests are qualified as acceptable.

EXAMPLE 2

The same steps for producing a printed decorative paper as disclosed in Example 1 were carried out, except that the outermost transparent layer was omitted. For the printed metallic layer was used: pigment Iriodin 9103 (Merck) and water soluble casein based binder, in a total amount of about 3 g/m² after drying. For the printed non-metallic pigmented layers two layers were applied, comprising pigments carbon black, blue29, red49, white $TiO_2$ and water soluble casein based binder, in a total amount of about 3 g/m² after drying (two layers together).

On basis of the printed decorative paper thus manufactured several HPL panels were manufactured according to the process conditions, core materials and outer polymerized layer as disclosed in Example 1 of U.S. Pat. No. 4,927,572.

During production scale tests to deposit the radiation curable layer the present inventors found that the pigmented layers, especially metallic, were easily being released and the equipment was contaminated. This printed decorative paper is not feasible in production, due to the absence of the transparent layer.

EXAMPLE 3

The process for producing a printed decorative paper in Example 3 comprises a step of providing a substrate paper and applying by rotogravure printing a mixture of binder and metallic pigments on the substrate paper for obtaining a printed metallic layer. The area coverage of the mixture on the substrate paper is about 100%. In the next step only transparent binder is applied in area coverage of about 100% on the product obtained after rotogravure printing, i.e. the printed metallic layer. A mixture of binder and non-metallic pigments is applied by rotogravure printing in a partial coverage, and the application is repeated two times for obtaining printed non-metallic pigmented design layers.

The printed metallic layer comprises pigment Iriodin 9303 (Merck) and water soluble casein based binder, in a total amount of about 3 g/m² after drying. The transparent layer is a water soluble casein based binder, in a total amount of about 3 g/m² after drying. The printed non-metallic pigmented layers are applied as two layers, in a total amount of about 2 g/m² after drying (2 layers together), and the pigments are carbon black, yellow53, red49, white $TiO_2$ and water soluble casein based binder. The radiation curing transparent coating is a polyurethane acrylate radiation curable resin, in a total amount of about 75 g/m².

On basis of the printed decorative paper thus manufactured several HPL panels were manufactured according to the process conditions and core materials as disclosed in Example 1 of U.S. Pat. No. 4,927,572.

The results of panels thus manufactured are: a grey scale of 4, after weathering test (according to ISO 105 A02 assessment method). The production scale tests are qualified as acceptable.

The invention claimed is:

1. A method for producing a printed decorative paper comprising the steps of:
    i) providing a substrate paper;
    ii) applying to said substrate paper a decorative layer;
    iii) applying to said decorative layer a liquid coating comprising a polymerizable mixture;
    iv) polymerizing said polymerizable mixture to form a polymerized layer on said decorative layer, wherein said step ii) of applying to said substrate paper a decorative layer comprises a step a) of applying a liquid binder and metallic pigments on said substrate paper for manufacturing a printed metallic layer;
    wherein said step ii) further comprises after step a) a step b) of applying a composition comprising additional liquid binder and pigments in discrete parts on said printed metallic layer obtained according to step a) for manufacturing a printed pigmented design layer, wherein said pigments in step b) are non-metallic pigments wherein the amount of said composition of step b) comprises liquid binder and non-metallic pigments, applied in an amount of 2-15 g/m².

2. The method for producing a printed decorative paper according to claim 1, wherein step b) is repeated at least two times for obtaining several layers of additional liquid binder and pigments in discrete parts for manufacturing several printed pigmented design layers, wherein said pigments in step b) are non-metallic pigments wherein the amount of said composition of step b) comprises liquid binder and non-metallic pigments, applied in an amount of 2-15 g/m².

3. The method for producing a printed decorative paper according to claim 1, wherein said step ii) further comprises a step c) of applying a transparent layer of liquid binder composition on said printed pigmented layer or layers obtained after step b) for manufacturing a transparent binder layer, wherein the amount of said composition of step c), comprising liquid binder, is applied in an amount of 2-15 g/m², wherein said liquid binder for manufacturing said transparent binder layer according to step c) comprises a non-radiation curable material.

4. A method for producing a printed decorative paper comprising the steps of:
    i) providing a substrate paper;
    ii) applying to said substrate paper a decorative layer;
    iii) applying to said decorative layer a liquid coating comprising a polymerizable mixture;
    iv) polymerizing said polymerizable mixture to form a polymerized layer on said decorative layer, wherein said step ii) of applying to said substrate paper a decorative layer comprises a step a) of applying a liquid binder and metallic pigments on said substrate paper for manufacturing a printed metallic layer;
    wherein said step ii) further comprises after step a) a step d) of applying a transparent layer of liquid binder composition on said printed metallic layer obtained according to step a) for manufacturing a transparent binder layer, wherein the amount of said composition of step d) comprising liquid binder, is applied in an amount of 2-15 g/m²,
    wherein said liquid binder for manufacturing said transparent binder layer according to step d) comprises a non-radiation curable material;
    wherein said step ii) further comprises after step a) and step d) a step e) of applying a composition of additional liquid binder and pigments in discrete parts on said transparent binder layer for manufacturing a printed pigmented design layer, wherein said pigments in step e) are non-metallic pigments, wherein the amount of said composition of step e) comprising liquid binder and non-metallic pigments, is applied in an amount of 2-15 g/m².

5. The method for producing a printed decorative paper according to claim 4, wherein step e) is repeated at least two times for obtaining several layers of additional liquid binder and pigments in discrete parts for manufacturing several printed pigmented design layers, wherein said pigments in step e) are non-metallic pigments.

6. The method for producing a printed decorative paper according to claim 3, wherein said liquid binder for said transparent binder layer is a water-soluble casein based binder.

7. The method for producing a printed decorative paper according to claim 1, wherein said liquid coating according to step iii) comprises radiation curable components and/or thermo curable components wherein the amount of said liquid coating of step iii) is applied in a range of 10-200 g/m².

8. The method for producing a printed decorative paper according to claim 1, wherein in step a), comprising liquid binder and metallic pigments, said metallic pigments have an average size distribution of 5-40 μm, wherein said metallic pigments are $TiO_2$ coated mica of a rutile nature wherein the amount in step a), comprising liquid binder and metallic pigments, is in a range of 2-15 g/m².

9. A method for producing a decorative panel, comprising the steps of: providing a printed decorative paper according to claim 1;
    applying to said printed decorative paper a core layer and thermo pressing, said decorative layer and said core layer together under conditions of elevated temperature and pressure such that during said thermo pressing, said printed decorative paper, with said polymerized surface layer located thereon, rests on said core such that said polymerized surface layer forms the outermost layer of said decorative panel.

10. The method for producing a decorative panel according to claim 9, wherein said core layer comprises at least one material selected from the group consisting of wood, a plurality of sheets of paper, plastic, or metal nonwoven fabric, fiber mats, thermo pressed stack of synthetic resin impregnated fiber-containing layers, thermoplastic based with mineral fibers, metal sheet and minerals combined with thermosetting polymer.

11. The method for producing a printed decorative paper according to claim 4, wherein the amount in step e) comprising liquid binder and non-metallic pigments, is in a range of 2-15 g/m².

12. The method for producing a printed decorative paper according to claim 2, wherein said step ii) further comprises a step c) of applying a transparent layer of liquid binder composition on said printed pigmented layer or layers obtained after step b) for manufacturing a transparent binder layer, wherein the amount of said composition of step c), comprising liquid binder, is applied in an amount of 2-15 g/m$^2$, wherein said liquid binder for manufacturing said transparent binder layer according to step c) comprises a non-radiation curable material.

13. The method for producing a printed decorative paper according to claim 4, wherein said liquid binder for said transparent binder layer is a water-soluble casein based binder.

14. The method for producing a printed decorative paper according to claim 1, wherein said liquid binder of step (a) and said additional liquid binder of step (b) each comprise a water-soluble casein based binder.

\* \* \* \* \*